United States Patent
Nishikawa

(10) Patent No.: US 9,902,655 B2
(45) Date of Patent: Feb. 27, 2018

(54) ZIRCONIUM OXIDE-TITANIUM OXIDE COMPOSITE SOL AND PRODUCTION METHOD THEREOF

(71) Applicant: DAIICHI KIGENSO KAGAKU KOGYO CO., LTD., Osaka-shi, Osaka (JP)

(72) Inventor: Taku Nishikawa, Osaka (JP)

(73) Assignee: DAIICHI KIGENSO KAGAKU KOGYO CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/029,440

(22) PCT Filed: Sep. 1, 2014

(86) PCT No.: PCT/JP2014/072903
§ 371 (c)(1),
(2) Date: Apr. 14, 2016

(87) PCT Pub. No.: WO2015/056488
PCT Pub. Date: Apr. 23, 2015

(65) Prior Publication Data
US 2016/0229751 A1   Aug. 11, 2016

(30) Foreign Application Priority Data
Oct. 18, 2013 (JP) .................... 2013-217434

(51) Int. Cl.
*C04B 35/49* (2006.01)
*C01G 25/00* (2006.01)
(Continued)

(52) U.S. Cl.
CPC .............. *C04B 35/49* (2013.01); *C01G 25/00* (2013.01); *C01G 25/02* (2013.01); *C04B 35/46* (2013.01);
(Continued)

(58) Field of Classification Search
CPC ..... B01J 21/063; B01J 21/066; C01P 2004/64
See application file for complete search history.

(56) References Cited

U.S. PATENT DOCUMENTS

| 6,626,987 B1 * | 9/2003 | Suzuki | ................. B01J 13/0008 106/286.2 |
| 2009/0169892 A1 * | 7/2009 | Bazzi | ...................... B01J 13/02 428/404 |

(Continued)

FOREIGN PATENT DOCUMENTS

| CN | 101815675 A | 8/2010 |
| JP | 61-43286 B2 | 9/1986 |

(Continued)

OTHER PUBLICATIONS

Translation of JP 2008-31023 to Iwakura obtained from the JPO/AIPN website on Jun. 2, 2017.*

(Continued)

*Primary Examiner* — Michael A Salvitti
(74) *Attorney, Agent, or Firm* — Westerman, Hattori, Daniels & Adrian, LLP

(57) ABSTRACT

The present invention provides a zirconium oxide-titanium oxide composite sol comprising single nano-level, monodisperse, and amorphous zirconium oxide-titanium oxide composite nanoparticles.
Specifically, the present invention provides a zirconium oxide-titanium oxide composite sol comprising zirconium oxide-titanium oxide composite nanoparticles dispersed in a dispersion medium;
wherein the zirconium oxide-titanium oxide composite nanoparticles have a $ZrO_2/TiO_2$ composition ratio of 95/5 to 50/50, and a primary particle diameter of 10 nm or less, and
the dispersion medium is a polar dispersion medium.

3 Claims, 1 Drawing Sheet

(51) Int. Cl.
*C01G 25/02* (2006.01)
*C04B 35/46* (2006.01)

(52) U.S. Cl.
CPC ...... *C01P 2002/50* (2013.01); *C01P 2002/72* (2013.01); *C01P 2004/04* (2013.01); *C01P 2004/51* (2013.01); *C01P 2004/64* (2013.01)

(56) References Cited

U.S. PATENT DOCUMENTS

| | | | | |
|---|---|---|---|---|
| 2010/0221556 | A1* | 9/2010 | Koyama | B82Y 30/00 428/446 |
| 2010/0239872 | A1* | 9/2010 | Koyama | B82Y 30/00 428/448 |
| 2010/0276649 | A1* | 11/2010 | Maruyama | B82Y 30/00 252/582 |
| 2011/0003142 | A1* | 1/2011 | Asuka | C08G 77/58 428/329 |
| 2011/0259244 | A1* | 10/2011 | Herbig | B82Y 30/00 106/448 |
| 2011/0260122 | A1* | 10/2011 | Nakagawa | B82Y 30/00 252/582 |
| 2011/0317239 | A1* | 12/2011 | Mori | C08G 77/14 359/241 |
| 2013/0253161 | A1* | 9/2013 | Amako | B82Y 30/00 528/32 |
| 2013/0333592 | A1 | 12/2013 | Nakagawa et al. | |
| 2014/0072720 | A1* | 3/2014 | Watkins | H01L 51/0015 427/487 |
| 2015/0329679 | A1* | 11/2015 | Yoshida | B82Y 30/00 525/475 |
| 2016/0229751 | A1* | 8/2016 | Nishikawa | C01G 25/00 |

FOREIGN PATENT DOCUMENTS

| | | |
|---|---|---|
| JP | 62-87242 | 4/1987 |
| JP | 10-310429 A | 11/1998 |
| JP | 2003-267704 A | 9/2003 |
| JP | 2004-18311 A | 1/2004 |
| JP | 2007-70212 A | 3/2007 |
| JP | 2008-31023 * | 2/2008 |
| JP | 2010-150066 A | 7/2010 |
| JP | 2010-195636 A | 9/2010 |
| JP | 2012-224509 A | 11/2012 |
| WO | 2010/098366 A1 | 9/2010 |

OTHER PUBLICATIONS

International Search Report dated Dec. 2, 2014, issued in counterpart International Application No. PCT/JP2014/072903 (3 pages).

Office Action dated Nov. 2, 2016, issued in counterpart Chinese Application No. 201480055279.1, with English translation. (14 pages).

* cited by examiner

ZIRCONIUM OXIDE-TITANIUM OXIDE COMPOSITE SOL AND PRODUCTION METHOD THEREOF

TECHNICAL FIELD

The present invention relates to a zirconium oxide-titanium oxide composite sol, and a method for producing the same.

BACKGROUND ART

Zirconium oxide is a useful raw material used for various applications. Specifically, zirconium oxide is used as a ceramic raw material in the fields of refractories, ceramic capacitors, oxygen sensors, piezoelectric materials, structures, solid oxide-type fuel cells, catalysts, coating compositions, binders, optical materials, coating agents, and the like.

When zirconium oxide is used as a raw material to obtain various products, the zirconium oxide is, in many cases, used after mixing and compounding with other materials. In these cases, the smaller the average particle diameter of the zirconium oxide and the more monodisperse the zirconium oxide is, the easier it is to mix and compound the zirconium oxide with other materials. When mixing and compounding are sufficient, the resulting composite has few local deviations in the composition. Thus, an improvement in product performance can be expected. That is, in order to pursue the improvement in product performance, it is necessary to sufficiently perform mixing and compounding to obtain more homogeneous composites.

Monodisperse zirconium oxide, which has a small average particle diameter, is desired in the field concerned; however, it is very difficult to control the aggregation of zirconium oxide. It is particularly difficult to obtain monodisperse zirconium oxide having an average particle diameter of several 100 nm or less.

To address the above problems, zirconium oxide sols can control aggregation by taking advantage of electrostatic repulsion between the sol particles; thus, monodisperse zirconium oxide sols having an average particle diameter of several 100 nm or less can be realized. These characteristics are unique to zirconium oxide sols, and zirconium oxide sols are therefore suitably used in the field concerned.

When the average particle diameter of the sol particles of the zirconium oxide sol is controlled to be small, it is advantageous in terms of surface activity due to a high specific surface area for applications concerning catalysts, structures, binders, etc. Specifically, sol particles with a smaller average particle diameter contribute to, for catalysts, an increase in the reaction rate, and for structures, a decrease in the generation temperature; for binders, a smaller amount of such sol particles contributes to high caking capacity etc.

The following zirconium oxide sols and methods for producing the same are disclosed.

PTL 1 discloses a colloidal sol in which most of the zirconium oxide particles are monoclinic crystals, the primary particle diameter is 3 to 10 nm, and the average diameter of secondary aggregate particles does not exceed 50 nm. PTL 1 also indicates that the colloid sol is obtained by adding hydrogen peroxide or a compound that produces hydrogen peroxide to a zirconium salt aqueous solution having a concentration of 0.05 to 2.0 mol/L, and heating the resulting solution to 80 to 300° C.

PTL 2 discloses a production method that provides nanoparticles of 10 nm or less by controlling the aggregation of single nanoparticles using a polymer.

PTL 3 discloses a method for producing an amorphous zirconium oxide sol having a particle diameter of 1 to 20 nm. This method is realized by controlling the zirconium concentration and the amount of nitric acid.

PTL 4 proposes a method for obtaining a composite sol by hydrolyzing a mixed solution of zirconium, titanium, and tin; however, the dispersed state of each element is nowhere described, and the particle diameter is as wide as 1 to 100 nm. Moreover, this method incurs many problems; for example, the use of metal tin etc. may lead to the generation of hydrogen.

Thus, PTL 1 to PTL 4 disclose methods for producing zirconium oxide sols; however, these methods incur problems, such as the necessity of adding polymers in order to maintain single nanoparticles in a highly dispersed state, and the limited acid concentration of the zirconium salt solution. There has been no method that can easily realize single nanoparticles. Furthermore, no method has been found to essentially control the problem of crystal growth of zirconium oxide particles. Accordingly, it is not easy to mass-produce single nano-level zirconium oxide sols.

CITATION LIST

Patent Literature

PTL 1: JPS61-43286B
PTL 2: JP2003-267704A
PTL 3: JP2007-070212A
PTL 4: JPH10-310429A

SUMMARY OF INVENTION

Technical Problem

An object of the present invention is to provide a single nano-level and monodisperse zirconium oxide sol, and a simple method for producing the same. The intention of the present invention is to achieve a single nano-level, monodisperse, and amorphous zirconium oxide-titanium oxide composite sol by using titanium oxide in combination with zirconium oxide; therefore, to be precise, the present invention provides a zirconium oxide-titanium oxide composite sol, and a method for producing the same.

Solution to Problem

As a result of intensive studies to achieve the above object, the present inventors unexpectedly found that the object could be achieved by preparing beforehand a zirconium-titanium composite hydroxide by a coprecipitation method, and using the composite hydroxide as a raw material to produce a zirconium oxide-titanium oxide composite sol. Specifically, the present inventors found that a monodisperse, amorphous, and single nano-level zirconium oxide-titanium oxide composite sol could be produced with few restrictions on acid and concentration in the production conditions, and without the need to add a dispersant etc. Thus, the present invention has been completed.

Specifically, the present invention relates to the following zirconium oxide-titanium oxide composite sol and production method.

1. A zirconium oxide-titanium oxide composite sol comprising zirconium oxide-titanium oxide composite nanoparticles dispersed in a dispersion medium;
   wherein the zirconium oxide-titanium oxide composite nanoparticles have a $ZrO_2/TiO_2$ composition ratio of 95/5 to 50/50, and a primary particle diameter of 10 nm or less, and
   the dispersion medium is a polar dispersion medium.

2. The zirconium oxide-titanium oxide composite sol according to item 1, wherein the composite sol has a haze value of 20% or less.

3. The zirconium oxide-titanium oxide composite sol according to item 1 or 2, wherein both zirconium oxide and titanium oxide contained in the zirconium oxide-titanium oxide composite nanoparticles have an amorphous crystal structure.

4. A method for producing a zirconium oxide-titanium oxide composite sol comprising zirconium oxide-titanium oxide composite nanoparticles dispersed in a dispersion medium, the method comprising:
   (1) step 1 of mixing a zirconium salt solution and a titanium salt solution so that the $Zr_2/TiO_2$ composition ratio in terms of oxide is 95/5 to 50/50, thereby obtaining a mixed solution;
   (2) step 2 of adding a base to the mixed solution to thereby obtain a zirconium-titanium composite hydroxide;
   (3) step 3 of dispersing the zirconium-titanium composite hydroxide in a polar dispersion medium to thereby obtain a dispersion;
   (4) step 4 of adding an acid to the dispersion to thereby obtain an acid dispersion; and
   (5) step 5 of heating the acid dispersion under reflux at 90 to 120° C. to thereby obtain a zirconium oxide-titanium oxide composite sol.

Advantageous Effects of Invention

In the zirconium oxide-titanium oxide composite sol of the present invention, the $ZrO_2/TiO_2$ composition ratio of the zirconium oxide-titanium oxide composite nanoparticles is 95/5 to 50/50; therefore, the primary particle diameter is 10 nm or less, and the composite sol is single nano-level, monodisperse, and amorphous. Accordingly, the haze value is 20% or less. Moreover, because the composite nanoparticles are dispersed in a polar dispersion medium, the sol can be used in various industrial fields.

In terms of the production method, the $ZrO_2/TiO_2$ composition ratio in terms of oxide is set to 95/5 to 50/50, and titanium is contained as a second component; therefore, the grain growth and grain aggregation of the zirconium-titanium composite hydroxide are suppressed, and a high refractive index of the composite nanoparticles can be ensured. Furthermore, the state of aggregation of the composite nanoparticles can also be controlled by changing (controlling) the zeta potential through the adjustment of the amount of acid added in step 4.

DESCRIPTION OF EMBODIMENTS

Figure 1:
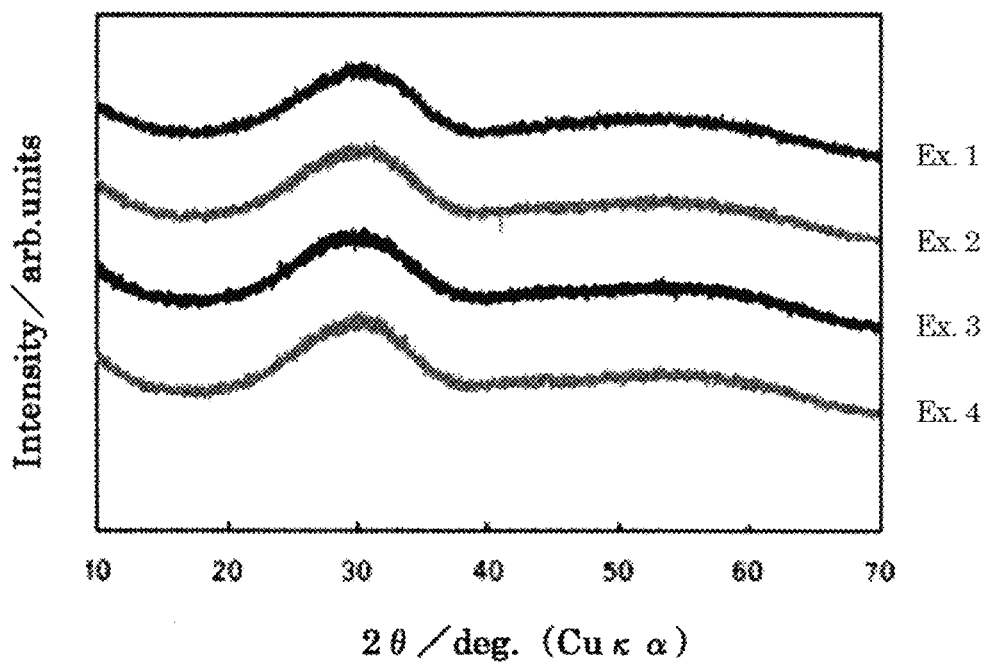
FIG. 1 shows the XRD spectra of solids obtained by drying the zirconium oxide-titanium oxide composite sols produced in Examples 1 to 4 at 100° C.

The zirconium oxide-titanium oxide composite sol of the present invention and the method for producing the same are described in detail below.

1. Zirconium Oxide-Titanium Oxide Composite Sol

The zirconium oxide-titanium oxide composite sol of the present invention is characterized in that the composite sol comprises zirconium oxide-titanium oxide composite nanoparticles dispersed in a dispersion medium;
   wherein the zirconium oxide-titanium oxide composite nanoparticles have a $ZrO_2/TiO_2$ composition ratio of 95/5 to 50/50, and a primary particle diameter of 10 nm or less, and
   the dispersion medium is a polar dispersion medium.

Hereinafter, the zirconium oxide-titanium oxide composite sol is also referred to as "composite sol," and the zirconium oxide-titanium oxide composite nanoparticles are also referred to as "composite nanoparticles."

The $ZrO_2/TiO_2$ composition ratio (molar ratio) may be 95/5 to 50/50. In particular, the $ZrO_2/TiO_2$ ratio is preferably 90/10 to 60/40, and more preferably 80/20 to 70/30.

In the present invention, titanium oxide is highly dispersed in the composite nanoparticles; therefore, the grain growth and grain aggregation of the zirconium-titanium composite hydroxide are suppressed in the production process of the composite sol, and a high refractive index of the composite nanoparticles can be ensured.

The refractive index of the composite nanoparticles is preferably 1.6 or more, and may be 1.7 or more. When the content ratio of titanium oxide exceeds 50 mol %, the characteristics of titanium oxide is dominant, and photocatalyst activity is more likely to be exhibited. When the composite sol is used as a binder material, degradation of the binder may be promoted.

Since the grain growth and grain aggregation of the zirconium-titanium composite hydroxide are suppressed in the production process of the composite sol by highly dispersing titanium oxide in the composite nanoparticles, the composite nanoparticles are monodisperse with a particle diameter (primary particle diameter) of 10 nm or less (preferably 1 to 10 nm). When the primary particle diameter of the composite nanoparticles is less than 1 nm, it may be difficult to concentrate and purify the composite sol. The particle diameter in the present specification is measured by a Zetasizer Nano ZS (produced by Malvern Instruments).

The particle diameter (secondary particle diameter) of secondary aggregate particles of the composite nanoparticles is not limited, and is preferably 10 to 50 nm. A particle diameter of the secondary aggregate particles exceeding 50 nm is not preferable, because as the particle diameter increases, the transparency of the composite sol decreases, and the transparency of the film-formed product of the composite sol also decreases.

The haze value of the composite sol is preferably 20% or less, more preferably 10% or less, and most preferably 1 to 9%. When the haze value exceeds 20%, the transparency of the composite sol may be inferior, and the composite sol may not be suitably applied to optical materials etc. The haze value in the present specification is measured by a UV-2400PC spectrophotometer (produced by Shimadzu Corporation).

Both zirconium oxide and titanium oxide, which constitute the composite nanoparticles, have an amorphous crystal structure. FIG. 1 shows an XRD chart of dry solids of the composite sols of the present invention (corresponding to Examples 1 to 4). When the structure of composite nanoparticles is crystalline, the refractive index of the composite nanoparticles is high; however, it is difficult to atomize the composite particles. In contrast, the composite sol of the present invention is amorphous so that the characteristics of a single nano-level primary particle diameter are dominant.

A dispersion medium with polarity (a polar dispersion medium) is used as the dispersion medium contained in the composite sol. Examples of polar dispersion media include water, methanol, ethanol, propanol, butanol, and the like. These dispersion media can be used singly or as a mixture of two or more.

The composite sol of the present invention can be used, for example, as a raw material for acrylic coating solutions, silicon-based coating solutions, primer compositions, various resins, optical materials, and the like.

2. Method for Producing Zirconium Oxide-Titanium Oxide Composite Sol

Although the method for producing the above composite sol is not limited, the composite sol can be suitably produced by the following method for producing the composite sol according to the present invention. Specifically, the method for producing the composite sol according to the present invention is characterized in that the method comprises:

(1) step 1 of mixing a zirconium salt solution and a titanium salt solution so that the $Zr_2/TiO_2$ composition ratio in terms of oxide is 95/5 to 50/50, thereby obtaining a mixed solution;

(2) step 2 of adding a base to the mixed solution to thereby obtain a zirconium-titanium composite hydroxide;

(3) step 3 of dispersing the zirconium-titanium composite hydroxide in a polar dispersion medium to thereby obtain a dispersion;

(4) step 4 of adding an acid to the dispersion to thereby obtain an acid dispersion; and (5) step 5 of heating the acid dispersion under reflux at 90 to 120° C. to thereby obtain a zirconium oxide-titanium oxide composite sol.

Each step is described in detail below.

In step 1, a zirconium salt solution and a titanium salt solution are mixed so that the $ZrO_2/TiO_2$ composition ratio in terms of oxide is 95/5 to 50/50, thereby obtaining a mixed solution.

The zirconium salt solution can be prepared, for example, by dissolving a zirconium raw material in a suitable solvent. The zirconium raw material is not particularly limited, as long as it can supply zirconium ions. For example, when a water-based solvent, such as water, is used as the solvent, a zirconium inorganic acid salt, such as zirconium oxynitrate or zirconium oxychloride, can be used. In the present invention, it is preferable to use zirconium oxychloride in a water-based solvent (particularly water), in terms of industrial-scale productivity etc.

In the production method of the present invention, a titanium salt solution is added and mixed in the above zirconium salt solution. The titanium salt solution is not particularly limited, as long as it is solvated in the solvent used, and a product obtained by a known production method or a commercial product can be used. Specific examples thereof include titanium tetrachloride, titanium sulfate, titanium nitrate, titanium alkoxide, and the like. In the present invention, it is preferable to use a titanium tetrachloride solution, which is solvated in a water system, in terms of industrial-scale productivity etc.

As for the mixing ratio of the zirconium salt solution and the titanium salt solution, they are mixed such that, depending on the composition ratio of the composite nanoparticles contained in the final product, i.e., composite sol, the $ZrO_2/TiO_2$ composition ratio in terms of oxide is 95/5 to 50/50.

In step 2, a base is added to the mixed solution (for neutralization), thereby obtaining a zirconium-titanium composite hydroxide.

In the production method of the present invention, a base is added to the above mixture to produce a precipitate (coprecipitate). The base is not particularly limited. Examples thereof include ammonium hydroxide, ammonium bicarbonate, sodium hydroxide, potassium hydroxide, and the like. These bases can be used singly or as a mixture of two or more.

The amount of base added is not particularly limited, as long as a precipitate can be produced from the above solution. In general, the amount of base added is preferably an amount that makes the pH of the above solution 8 or more, more preferably an amount that makes the pH 9 or more, and most preferably an amount that makes the pH 10 or more. When the amount of base added is an amount that makes the pH of the solution less than 8, the zirconium component and the titanium component are not completely formed into hydroxide, and the yield of the zirconium-titanium composite hydroxide may be reduced.

In step 3, the zirconium-titanium composite hydroxide is dispersed in a polar dispersion medium to thereby obtain a dispersion.

In this step, the produced precipitate, i.e., zirconium-titanium composite hydroxide, is recovered by a solid-liquid separation method, and dispersed in a separately prepared polar dispersion medium to obtain a dispersion.

The solid-liquid separation method can be a known method, such as filtration, centrifugal separation, or decantation. After the zirconium-titanium composite hydroxide is recovered, the composite hydroxide may be washed with water, if necessary, to remove impurities. The allowable range of the impurity concentration may be such that there is no obstacle to the reaction to generate the composite sol, and no obstacle to use of the composite sol.

When the zirconium-titanium composite hydroxide is dispersed in a polar dispersion medium (e.g., a water-based dispersion medium) to obtain a dispersion (slurry), the component concentration of the slurry is preferably 1 to 20 wt. %, and more preferably 2 to 10 wt. %, in terms of oxide. A component concentration exceeding 20 wt. % is not suitable because the slurry is thickened. In contrast, a component concentration below 1 wt. % is disadvantageous in terms of production efficiency.

In step 4, an acid is added to the dispersion to thereby obtain an acid dispersion.

The acid is preferably a strong acid, such as nitric acid, hydrochloric acid, or sulfuric acid. Further, nitric acid is preferred because it is relatively likely to be allowed as an impurity in the applications of the composite sol. When the acid concentration is too low, the generation rate of the composite sol is remarkably reduced, and production efficiency is poor. The pH of the dispersion is generally 3 or more, preferably 1 or more, and more preferably 0.2 or more.

In step 5, the acid dispersion is heated under reflux at 90 to 120° C., thereby obtaining a zirconium oxide-titanium oxide composite sol.

When the acid dispersion of the zirconium-titanium composite hydroxide is heated under reflux at 90 to 120° C., the zirconium-titanium composite hydroxide can be peptized. The temperature of heating under reflux must be 90 to 120° C.; preferably, the composite hydroxide is heated to 95 to 105° C. to perform aging for 24 hours or more.

At less than 90° C., the zirconium-titanium composite hydroxide is not completely peptized, and remains as a precipitate. For less than 24 hours, the hydroxide similarly remains as a precipitate; this is not preferable in terms of yield. The completion of the reaction (peptization) can be visually confirmed because the solution becomes uniformly transparent.

The composite sol obtained through the above steps can be concentrated by cooling it to ordinary temperature, followed by ultrafiltration. In this case, the composite sol can be washed with ion exchange water to remove impurities. After the ultrafiltration, the pH may be changed using an acid or alkaline solution. Moreover, the dispersion medium may be replaced with a polar dispersion medium other than water. Specific examples thereof include methanol, ethanol, propanol, butanol, and the like. These polar dispersion media can be used singly or as a mixture of two or more.

The replacement method can be, for example, a known technique whereby a polar solvent mentioned above is added to the composite sol containing water as a dispersion medium, and dehydration and concentration are repeated by filtration.

The features of the present invention are further clarified below with reference to Examples and Comparative Examples.

EXAMPLES

The present invention is not limited to these Examples.
The zirconium oxide of composite nanoparticles obtained in the Examples and Comparative Examples contains 1.3 to 2.5 wt. % of hafnium oxide as an inevitable impurity.

Example 1

A titanium tetrachloride solution having a titanium oxide concentration of 15.5 wt. % (304.8 g; first grade reagent, produced by Wako Pure Chemical Ind., Ltd.) was added to 360.4 g of zirconium oxychloride solution having a zirconium oxide concentration of 20.2 wt. % ($ZrO_2/TiO_2$: 50/50; oxide amount: 120 g), and ion exchange water was added so that the oxide concentration was 7.0 wt. %. After the salt solution was heated to 70° C., 720 g of 25 wt. % ammonium hydroxide solution (first grade reagent, produced by Wako Pure Chemical Ind., Ltd.) was added as a neutralizing agent for 30 minutes. The temperature was maintained for 90 minutes, and cooled to 50° C. or less. The obtained zirconium-titanium composite hydroxide was subjected to solid-liquid separation, and washed with water to remove impurities.

Next, 140 g (oxide amount: 20 g) of the zirconium-titanium composite hydroxide, from which impurities had been removed, was dispersed in 860 g of water. While moderately stirring the slurry, 117.8 g of 60 wt. % nitric acid solution (SAJ first grade reagent) was added to adjust the pH to 0.2.

Then, the slurry was maintained at 100° C. for 48 hours while stirring, thereby obtaining a zirconium oxide-titanium oxide composite sol.

Subsequently, 3.8 g of anhydrous citric acid (guaranteed reagent, produced by Kishida Chemical Co., Ltd.) was added to 781.3 g (oxide amount: 15 g) of the sol. Further, 81.9 g of 25 wt. % ammonium hydroxide solution, which was a polar dispersion medium, was added to adjust the pH to 9.0. Thereafter, purification and concentration were repeated by ultrafiltration until the pH was 7.5, thereby obtaining a zirconium oxide-titanium oxide composite sol.

The composite sol was dried at 100° C. to obtain a solid powder. The XRD profiles of the powder measured by the XRD 2θ-θ measurement showed that the powder was amorphous (FIG. 1).

Figure 2:
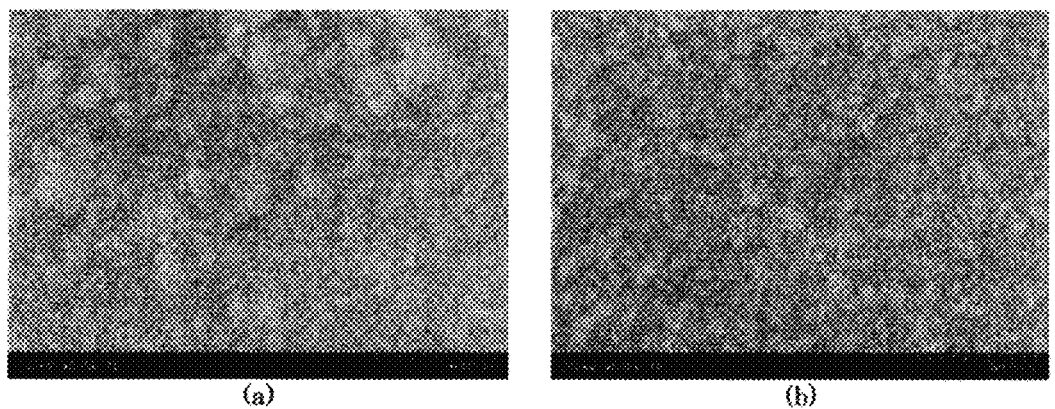
FIG. 2(a) shows a TEM observation image of the zirconium oxide-titanium oxide composite sol obtained in Example 1.
FIG. 2(b) shows a TEM observation image of the zirconium oxide-titanium oxide composite sol obtained in Example 2.

FIG. 2(a) shows the results of observing the composite sol by TEM.

The average particle diameter ($D_{50}$) of the composite sol measured by a dynamic light-scattering method was 3.5 nm. Moreover, the haze value was 5.2%. No precipitation or gelation was confirmed after the sol was allowed to stand for one week at room temperature. In addition, Table 1 shows the physical properties of the composite sol, the measurement results of the particle diameters ($D_{10}$), ($D_{90}$), and ($D_{99}$) of the composite sol, and the ultrafiltration yield.

Example 2

A zirconium oxide-titanium oxide composite sol was obtained in the same manner as in Example 1, except that the $ZrO_2/TiO_2$ ratio was changed to 70/30.

The composite sol was dried at 100° C. to obtain a solid powder. The XRD profiles of the powder measured by the XRD 2θ-θ measurement showed that the powder was amorphous (FIG. 1).

FIG. 2(b) shows the results of observing the composite sol by TEM.

The average particle diameter ($D_{50}$) of the composite sol measured by a dynamic light-scattering method was 3.3 nm. Moreover, the haze value was 6.5%. No precipitation or gelation was confirmed after the sol was allowed to stand for one week at room temperature.

In addition, Table 1 shows the physical properties of the composite sol, the measurement results of the particle diameters ($D_{10}$), ($D_{90}$), and ($D_{99}$) of the composite sol, and the ultrafiltration yield.

Example 3

A zirconium oxide-titanium oxide composite sol was obtained in the same manner as in Example 1, except that the $ZrO_2/TiO_2$ ratio was changed to 90/10.

The composite sol was dried at 100° C. to obtain a solid powder. The XRD profiles of the powder measured by the XRD 2θ-θ measurement showed that the powder was amorphous (FIG. 1).

The average particle diameter ($D_{50}$) of the composite sol measured by a dynamic light-scattering method was 3.0 nm. Moreover, the haze value was 8.1%. No precipitation or gelation was confirmed after the sol was allowed to stand for one week at room temperature. In addition, Table 1 shows the physical properties of the composite sol, the measurement results of the particle diameters ($D_{10}$), ($D_{90}$), and ($D_{99}$) of the composite sol, and the ultrafiltration yield.

Example 4

The same procedure was performed as in Example 2, except that the dispersion medium of the composite sol obtained in Example 2 was replaced with a polar dispersion medium (i.e., methanol). It was confirmed that the dispersion medium could be replaced with methanol. The composite sol was dried at 100° C. to obtain a solid powder. The XRD profiles of the powder measured by the XRD 2θ-θ measurement showed that the powder was amorphous (FIG. 1).

The average particle diameter ($D_{50}$) of the composite sol measured by a dynamic light-scattering method was 4.7 nm. Moreover, the haze value was 7.4%. No precipitation or gelation was confirmed after the sol was allowed to stand for one week at room temperature. In addition, Table 1 shows the physical properties of the composite sol, the measurement results of the particle diameters ($D_{10}$), ($D_{90}$), and ($D_{99}$) of the composite sol, and the ultrafiltration yield.

Comparative Example 1

The solvent of the sol obtained in Example 2 was replaced with a non-polar solvent (i.e., toluene). The sol particles aggregated; accordingly, a sol could not be obtained.

Comparative Example 2

The same starting materials as those of Example 2 were used. A zirconium salt solution and a titanium salt solution were not mixed, and were separately neutralized with ammonium hydroxide. The neutralization conditions were the same as those in Example 2, except that neutralization was separately performed on each solution. Next, the obtained zirconium hydroxide and titanium hydroxide were dispersed in 700 g of water, as in the Examples, and the post-process was performed in a similar manner. Although a sol was obtained, the average particle diameter ($D_{50}$) of the sol was 13.3 nm; accordingly, a single nano-zirconium oxide sol could not be obtained. Moreover, the haze value was 27.9%. In addition, Table 1 shows the physical properties of the sol, the measurement results of the particle diameters ($D_{10}$), ($D_{90}$), and ($D_{99}$) of the sol, and the ultrafiltration yield.

Comparative Example 3

The same treatment was performed as in Example 2, except that titanium tetrachloride was not added, and only zirconium oxide was used (i.e., $ZrO_2/TiO_2$: 100/0). Although a sol was obtained, the average particle diameter ($D_{50}$) of the sol was 16.4 nm; accordingly, a single nano-zirconium oxide sol could not be obtained. Moreover, the haze value was 30.7%. In addition, Table 1 shows the physical properties of the sol, the measurement results of the particle diameters ($D_{10}$), ($D_{90}$), and ($D_{99}$) of the sol, and the ultrafiltration yield.

INDUSTRIAL APPLICABILITY

In the zirconium oxide-titanium oxide composite sol of the present invention, the zirconium oxide-titanium oxide composite nanoparticles have a $ZrO_2/TiO_2$ composition ratio of 95/5 to 50/50; therefore, the primary particle diameter is 10 nm or less, and the composite sol is single nano-level, monodisperse, and amorphous. Accordingly, the haze value is 20% or less. Moreover, because the composite nanoparticles are dispersed in a polar dispersion medium, the sol can be used in various industrial fields.

In terms of the production method, the $ZrO_2/TiO_2$ composition ratio in terms of oxide is set to 95/5 to 50/50, and titanium is contained as a second component; therefore, the grain growth and grain aggregation of the zirconium-titanium composite hydroxide are suppressed, and a high refractive index of the composite nanoparticles can be ensured. Furthermore, the state of aggregation of the composite nanoparticles can also be controlled by changing (controlling) the zeta potential through the adjustment of the amount of acid added in step 4.

The invention claimed is:

1. A zirconium oxide-titanium oxide composite sol comprising zirconium oxide-titanium oxide composite nanoparticles dispersed in a dispersion medium;
   wherein the zirconium oxide-titanium oxide composite nanoparticles have a $ZrO_2/TiO_2$ composition ratio of 95/5 to 50/50, and a primary particle diameter of 10 nm or less,
   both zirconium oxide and titanium oxide contained in the zirconium oxide-titanium oxide composite nanoparticles have an amorphous crystal structure, and
   the dispersion medium is a polar dispersion medium.

2. The zirconium oxide-titanium oxide composite sol according to claim 1, wherein the composite sol has a haze value of 20% or less.

3. A method for producing a zirconium oxide-titanium oxide composite sol comprising zirconium oxide-titanium oxide composite nanoparticles dispersed in a dispersion medium, the method comprising:
   (1) step 1 of mixing a zirconium salt solution and a titanium salt solution so that the $ZrO_2/TiO_2$ composition ratio in terms of oxide is 95/5 to 50/50, thereby obtaining a mixed solution;
   (2) step 2 of adding a base to the mixed solution to thereby obtain a zirconium-titanium composite hydroxide;
   (3) step 3 of dispersing the zirconium-titanium composite hydroxide in a polar dispersion medium to thereby obtain a dispersion;

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| $ZrO_2/TiO_2$ | Molar ratio | 50/50 | 70/30 | 90/10 | 70/30 | 70/30 | 70/30 | 100/0 |
| Dispersion medium |  | Water | Water | Water | Methanol | Toluene | Water | Water |
| Oxide concentration | wt. % | 10 | 10 | 10 | 10 | Not isolated | 10 | 10 |
| Haze | % | 5.2 | 6.5 | 8.1 | 7.4 |  | 27.9 | 30.7 |
| $D_{10}$ | nm | 2.7 | 2.4 | 2.2 | 3.5 |  | 10.4 | 11.9 |
| $D_{50}$ | nm | 3.5 | 3.3 | 3.0 | 4.7 |  | 13.3 | 16.4 |
| $D_{90}$ | nm | 5.0 | 5.2 | 5.1 | 6.7 |  | 29.8 | 32.8 |
| $D_{99}$ | nm | 19.7 | 18.3 | 17.6 | 29.3 |  | 56.7 | 67.1 |
| Ultrafiltration yield | % | 96.7 | 94.6 | 93.5 | — |  | 88.1 | 83.0 |

(4) step 4 of adding an acid to the dispersion to thereby obtain an acid dispersion; and
(5) step 5 of heating the acid dispersion under reflux at 90 to 120° C. to thereby obtain a zirconium oxide-titanium oxide composite sol.

\* \* \* \* \*